US012657922B2

(12) United States Patent
Chinwatanakit et al.

(10) Patent No.: US 12,657,922 B2
(45) Date of Patent: Jun. 16, 2026

(54) POSITION AND TIME TRACKING SYSTEM BASED ON PHOTOGRAPHS

(71) Applicants: Worapot Chinwatanakit, Bangkok (TH); Suprasert Khaolaorr, Bangkok (TH)

(72) Inventors: Worapot Chinwatanakit, Bangkok (TH); Suprasert Khaolaorr, Bangkok (TH)

( * ) Notice: Subject to any disclaimer, the term of this patent is extended or adjusted under 35 U.S.C. 154(b) by 304 days.

(21) Appl. No.: 18/574,766

(22) PCT Filed: Jul. 1, 2022

(86) PCT No.: PCT/TH2022/000027
§ 371 (c)(1),
(2) Date: Dec. 28, 2023

(87) PCT Pub. No.: WO2023/277829
PCT Pub. Date: Jan. 5, 2023

(65) Prior Publication Data
US 2024/0296680 A1 Sep. 5, 2024

(30) Foreign Application Priority Data
Jul. 1, 2021 (TH) ................................ 2103001895

(51) Int. Cl.
*G06V 20/52* (2022.01)
*G06T 7/70* (2017.01)
*H04L 67/5682* (2022.01)

(52) U.S. Cl.
CPC ................ *G06V 20/52* (2022.01); *G06T 7/70* (2017.01); *H04L 67/5682* (2022.05); *G06T 2207/30201* (2013.01)

(58) Field of Classification Search
CPC .......... G06V 20/52; G06V 10/96; G06T 7/70; G06T 2207/30201; H04L 67/5682
USPC ......................................................... 382/103
See application file for complete search history.

(56) References Cited

U.S. PATENT DOCUMENTS

| | | | | |
|---|---|---|---|---|
| 6,940,998 | B2 * | 9/2005 | Garoutte | G06V 20/52 348/E7.086 |
| 9,940,524 | B2 * | 4/2018 | Krishnamoorthy | H04L 67/12 |
| 11,580,259 | B1 * | 2/2023 | Kennedy | G06F 21/6245 |
| 2017/0300758 | A1 * | 10/2017 | Renkis | G08B 13/19656 |
| 2022/0182414 | A1 * | 6/2022 | Howard | H04L 67/143 |

FOREIGN PATENT DOCUMENTS

| | | |
|---|---|---|
| TH | 1303001397 | 8/2014 |
| TH | 1803002474 | 5/2019 |

* cited by examiner

*Primary Examiner* — Allen H Nguyen

(57) ABSTRACT

The position and time tracking system based on photographs comprises a host and a client connected via network. The client's memory is saved in with an input, which controls at least two imaging devices together with a variable-checking device. At least the client's position and time tracking variables are compared with rules that are input from the host via a user interface unit in authorising the imaging devices to take image input, where acquired images are compressed with the checked variables, and a data storage unit checks network connection's stability and transmits data to the host once the connection is stable. Conversely, if the connection is unstable, images are saved into the client's memory, and data are transmitted to the host when the connection has been stable.

10 Claims, 1 Drawing Sheet

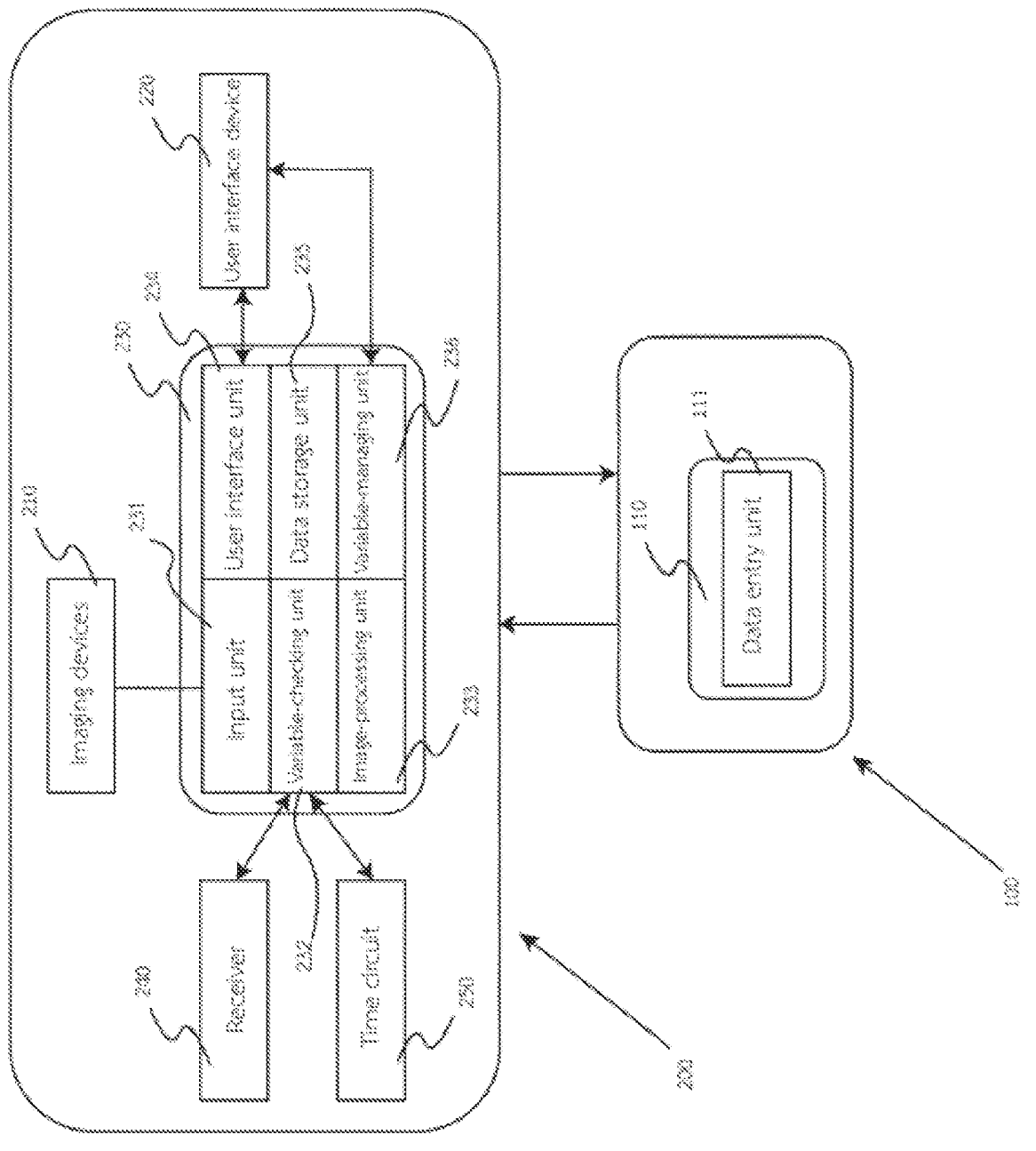

POSITION AND TIME TRACKING SYSTEM BASED ON PHOTOGRAPHS

FIELD OF THE INVENTION

Engineering, particularly as regards the position and time tracking system based on photographs

BACKGROUND OF THE INVENTION

Currently, security measures for buildings or areas are very important for reliability for owners, service providers or occupants in respective areas; for prevention of various surprising events that are not only limited to robbery but also include accidents, such as fire and leakage current; and for inspection of environmental integrity, such as decomposition of walls, fences, road surface, etc.

There have been inventions in response and development of the capability of security measures in various form, whether they be used of closed-circuit television; sensors to detect variables, particularly detection of movements and smoke; and invention of robots or automatic systems to help in inspection of pre-determined spots or areas.

However, no matter how high the performance or the checking accuracy the inventions have, they cannot replace human aspects of security measures that are more flexible in operation than various automatic systems are and capable of making appropriate decision in circumstances that are strange or different from normal. Nevertheless, human aspects of security measures usually focus on inspection, which has several limitations, such as on accuracy of checking, consistency of checking, or proper and prompt responses to unexpected events.

Inventions capable of improving the efficiency of human aspects of security measures to overcome the said limitations, therefore, are necessary.

After performing Thai patent database searches, some prior inventions to help develop the capability of human aspects of security measures so that they overcome original limitations were found. Most of them are merging of human aspects of security measures with other supplementary inventions, whether they be the development of devices or sensors to help enable security guards to check abnormal events efficiently, the development of highly reliable devices for communication so that security guards can communicate to their command centres once unusual events are detected, or the development of systems are capable of inspecting the operation of security guards who move along checkpoint in order to ensure consistency and increase occupants' confidence or to enable security controllers to check the operation and improve their plans accordingly. For example:

A Thai patent, application number 1303001397, with the invention title "Combined security network and management system for delivery or working guardsmen" mentions the use of a device in indication of inspection by security guards, such as the use of a card reader or an indication transmitter placed at different positions along the inspection path to record guards' patrol and transmit the said monitoring to a host for saving.

A Thai petty patent, application number 1803002474, with the invention title 'Operation recorder of guardsmen using RFID' mentions an operational system that focuses on the use of RFID (Radio Frequency Identification) in monitoring whether security guards have inspected pre-determined spots.

It can be seen that both inventions focus on checking security guards' inspection to enable controllers in checking and improving their operational paths. Nevertheless, both inventions as well as other inventions with similar operational quality or objectives cannot yet solve the problem of the act of taking guards' place wrongfully; that is, in certain inventions, one security guard can assign an identification device to or accept taking care of such a device for another guard, or may impose themselves as if they had been at determined spots by the determined time using various methods. For example, in a system with the use of image processing to verify oneself, photographing in advance may be used in transmitting position verification at the determined time without having to go to the said inspection position and so on.

Additionally, both inventions need installation of the right devices or tools at the right positions, and the said devices and tools need highly stable network connection with other devices. Sometimes overseers cannot install devices or tools at positions that need inspected. Also, the said positions may have unstable network connection that may cause confusion or erroneous outcomes and affect both overseers and inspecting guards.

Meanwhile, the position and time tracking system based on photographs according to this invention consists of various functioning units that operate together to facilitate guards and, at the same time, help enable the overseer to check the guards' operation accurately, beginning from an input unit that operates together with at least two imaging devices and a variable-checking unit that is at least provided to check a client's positioning data and the current tine to compare with pre-set rules for use in the imaging device control to take image input from users. A delay is set between switching between both imaging devices so that the imaging is performed by one of them at a time, and acquired images are forwarded to an image-processing unit for compression of both images with data on the time and places of the image input, and data are transmitted for saving at a host in real time.

A data storage unit is further provided to check network connection between the host and the client. In the event of stable connection, the data storage unit is set to release the compressed images from the image-processing unit to the host as usual. However, should there be unstable connection between the host and the client, the said compresses images are stored in the client's temporary memory; the network connection is checked continuously or according to a determined time frame; and the said data are transmitted to the host once stable network connection is detected.

The said invention is able to solve the problem of patrol on behalf of one another by using at least two sets of photograph data in position checking and guards' facial photographs, minimise unnecessarily too much screen touching via automatic control and switching of the imaging devices at the determined time, and solve the unstable connection problem with the said data storage unit, enabling security guards to use this invention even if respective inspection spots are in bad corners. AT the same time, the overseer does not need to have devices or tools installed at pre-determined check spots, and installation and maintenance costs can be much reduced.

SUMMARY OF THE INVENTION

The position and time tracking system based on photographs consists of a client and a host connected to each other via a network. The client is saved in with an input unit that operates together with a variable-checking unit in control of imaging devices according to determined rules, and acquired images are transmitted to a processing unit that compresses and combines various data prior to transmission for saving at the host, wherein the overseer can check the said data via their own client. If the said network connection is unstable, a provided data storage unit stores the said compressed data and transmits them to the host once the said network connection resumes its stability.

The said invention has an objective to check the operation of security guards who petrol various spots by minimising usage conditions for all users; that is, no other accessories need to be installed, and no stable network connections are needed in any inspection sets. This inspection-checking capability is increased with customary control of the imaging devices.

BRIEF DESCRIPTION OF DRAWINGS

FIG. 1 showing an embodiment of all operational units of the position and time tracking system based on photographs.

DESCRIPTION OF EMBODIMENTS

The position and time tracking system based on photographs according to this invention is merely illustrated as compositions and an appearance. The position and time tracking system based on photographs is for monitoring positions and the time, as well as recording the said data in combination with imaging in accordance with rulers to help enable the overseer to monitor guards' inspection accuracy, using minimal resources for use and system maintenance.

FIG. 1 show an embodiment of all operational units of the position and time tracking system based on photographs, where on this illustration, the position and time tracking system based on photographs is composed of a host 100 connected with at least one client 200 via network connection. The said client 200 is initially provided as a calculator, such as a computer, a laptop, a mobile or another device designed for calculation specially. The said client 200 is at least composed of at least two imaging devices 210, a user device 220 initially provided as a touch screen, and a memory 230 in which is saved with user identity initially provided in the form of a user identification number and status identity initially identified as at least one type being the overseer or guards and also saved with an operational unit that can be read and followed by the client 100 and the host 200 that at least consists of:

An input unit 231 is provided to operate together with a variable-checking unit 232 and the imaging devices 210 such that the imaging device 210 are controlled to take images according to the determined rule upon an operation command; that is, the first imaging device 210 is controlled to operate upon a command from the variable-checking unit 232 and, upon image input completion, another imaging device 210 is controlled for imaging in another direction within a pre-determined period. With the said operational quality, outcomes are yielded in the form of two sets of image data, one being image data from the first imaging device 210 and the other being data from the second imaging device 210. All of the said image data are further transmitted to an image-processing unit 233.

That variable-checking unit 232 is provided to operate together with a variable checker in the client 200 in the form of at least inspection of position and time tracking data once an imaging command is input by the user, such as to operate together with a receiver 240 of the client 200 in the form of real-time positioning of the client 200, check the time variable by operating together with a time circuit 250 inside the client 200, obtain time data from a determined source via network connection, etc. Also, should a variable received from the variable-checker be equal or similar to a rule for processing as pre-determined by the overseer, the variable-checking unit 232 is set to transmit the checked variable to the image-processing unit 233 and further transmit an operation command to the input unit 231.

Meanwhile, the said image-processing unit 233 is set to compress images from the input unit 231 with the checked variable from the variable-checking unit 232, and forward to the host 100 via network connection.

Also, a user interface unit 234 provided to transmit the user identity at least consisting of a user identification number to the host 100 in the form of obtaining the rule for processing by the variable-checking unit 232 consisting of a least one set of positioning rule and time rule that is involved with the user identity of the respective client 200 by referring to the related user identity saved in the client 200, and all the said data are saved in the memory 230 to be on stand-by for other operational units in the client 200 later. The user can browse data on rules and images compressed and stored in the memory 230 via the user interface 220. Other rules that may be used in the processing by the image-processing unit 233, a data storage 234 or other operational units in the client 200 can also be requested via this user interface unit 234.

The user interface unit 234 is provided to receive the user identity of other clients 200 from users via the user interface device 220 and forward to the host 100 together with the user identity of its own client 200 in the form of connection among at least two users, resulting in the user interface unit 234 being able to request the rule related to the user identity easily.

Also, the variable-checking unit 232 is further set with time checking in real time, comparing with the time rule requested by the user interface unit 234 and sending a notification command for the user interface device 220 to notify the user of the time through the right method with the user interface device 220 when it is detected that the time variable is consistent with the time rule or to notify in advance prior to the time variable being consistent with the time rule, such as by flashing, vibration or a sound via a mobile, etc. The user can set the advance notification as required, such as having the variable-checking unit 232 send a notification command to the user interface device 220 five, ten and fifteen minutes before the determined time rule, etc. This will help enable the user to prepare for their patrol and reach determined spots by the time determined by the overseer.

The memory 230 of the client 200 is further saved in with the data storage unit 235 that stages the compressed data from the image-processing unit 233 in the memory 230 prior to forwarding, and network connection between the client 200 and the host 100 is checked. Should the said network connection be stable, such as with continuous transmission, minimal data loss or high transmission capacity according to the pre-determined rule, the data storage unit 235 is set to forward the data to the host 100 via the said stable network connection immediately.

If all checked network connections are insufficiently stable, the data storage unit 235 is set to save the said compressed data in the memory 230 in the form of data staging and begin the countdown for checking the networks' stability again according to a determined time frame, such as re-checking every three minutes, etc. Once it is detected that the network connections are sufficiently stable, the data storage unit 235 is set to forward the data to the host 100 immediately and delete the said compressed data from the memory 230.

All clients 200 are provided with abilities to access and use all the above-mentioned operational units. Only the client that is saved in with the overseer status identity can access a management unit in the memory 230 that is at least composed of:

A variable-managing unit 236 is input by the user via the user interface device 220 with numerical data for determining various variables rules and transmits the said new rules to the host 100 along with the user identity in the form of addition, deletion or correction of the user identity-related rule in the host 100.

Meanwhile, that host 100 is composed of a memory 110 that is saved in with user identity of all users as connected with the rule and operation units, which can be read and followed by the host 100 and the client 200 that is initially composed of:

A data entry 111 is provided to search for the rule connected with the user identity input from the client 200 and forward the said rule to a requesting client 200.

The data entry unit 111 is further input with numerical data for determining various variables rules and the user identity from the client 200, adopts the said user identify in searching for a related rule, which is saved in the memory 110, and adds, deletes or correct the said user identity-related rule.

Any modifications according to this invention may be clearly understood and doable by those skilled in the art. These may fall under the scope and intention of this invention as presented in the appended claims.

BEST MODE FOR CARRYING OUT THE INVENTION

As described in Detailed Description of the Invention.

What is claimed is:

1. A position and time tracking system based on photographs, comprising a host connected with at least one client via network connection, wherein the said client via network connection, wherein the said client is at least composed of at least two imaging devices, a user interface device and a memory that is saved in with user identity and also an operational unit that can be read and followed by the client and the host at least comprising:

an input unit that is provided to operate together with a variable-checking unit for controlling the imaging devices to take images according to a determined rule upon an operation command and transmit all the said images to an image-processing unit;

the variable-checking unit that is provided to operate together with a variable-checking device in the client in the form of at least position and time tracking inspection once an imaging command is input by the user, and should the variable input from the variable-checking device be equal or similar to the rule for processing as pre-determined by the overseer, the variable-checking unit is set to transmit the checked variables to the image-processing unit and send an operation command to the input unit;

the image-processing unit that is provided to compress together photographs from the input unit and the checked variables from the variable-checking unit, and forward to the host via network connection;

and a user interface unit that is provided to transmit user identity that at least comprises a user identification number to the host in the form of a request for a rule for processing by the variable-checking unit and save all the said data in the memory;

while that host is composed of a memory that is saved in with user identity of all users as connected with a rule and an operational unit, which can be read and followed by the host and the client that is initially composed of:

a data entry unit that searches for a rule connected with the user identity input from the client and forward it to a requesting client.

2. The position and time tracking system based on photographs according to claim 1, wherein the user identity is at least composed of a user identification number and status identity.

3. The position and time tracking system based on photographs according to claim 1, wherein the input unit controls the first imaging device to begin its operation following an operation command from the variable-checking unit and, upon image input completion, controls another imaging device for imaging in another direction within a pre-determined period.

4. The position and time tracking system based on photographs according to claim 1, wherein the variable-checking unit is provided to operate together with a receiver of the client in the form of real-time positioning of the client.

5. The position and time tracking system based on photographs according to claim 1, wherein the variable-checking unit is provided to either check a time variable by operating together with a time circuit in the client or obtain time data from a determined source via network connection, or a combination of both.

6. The position and time tracking system based on photographs according to claim 1, wherein the memory of the client is further saved in with a data storage unit that stages data as compressed by the image-processing unit in the memory if it is detected that the network connection between the host and the client is unstable, and the said data is transmitted to the host once it is detected that the network connection resumes its stability.

7. The position and time tracking system based on photographs according to claim 1, wherein the rule for processing by the variable-checking unit at least comprises one set of positioning rule and time rule involved with the user identity of the respective client by referring to the related user identity saved in the client.

8. The position and time tracking system based on photographs according to claim 7, wherein the variable-checking unit further checks time data in real time and compares them with the time rule requested by the user interface unit, and a notification command is sent to the user interface device either to notify the user via the right method when it is detected that the time variable and the time rule are consistent or to notify in advance prior to the time variable and the time rule being consistent, or a combination of both.

9. The position and time tracking system based on photographs according to claim 1, wherein the memory of the client is further saved in with a variable-managing unit that is input by the user via the user interface device in the form of numerical data for determining various variables rules, transmits the said new rulers to the host along with the user identity in the form of addition, deletion, or correction of the user identity-related rule in the host.

10. The position and time tracking system based on photographs according to claim 1, wherein the user interface unit has the user identity of other clients input by the user via the user interface device and forwards it to the host along with the user identity of its own client in the form of connection building among at least two users.

* * * * *